(12) United States Patent
Zhang et al.

(10) Patent No.: US 11,379,180 B2
(45) Date of Patent: Jul. 5, 2022

(54) METHOD AND DEVICE FOR PLAYING VOICE, ELECTRONIC DEVICE, AND STORAGE MEDIUM

(71) Applicant: BEIJING DAJIA INTERNET INFORMATION TECHNOLOGY CO., LTD., Beijing (CN)

(72) Inventors: Yang Zhang, Beijing (CN); Meizhuo Li, Beijing (CN)

(73) Assignee: BEIJING DAJIA INTERNET INFORMATION TECHNOLOGY CO., LTD, Beijing (CN)

( * ) Notice: Subject to any disclaimer, the term of this patent is extended or adjusted under 35 U.S.C. 154(b) by 0 days.

(21) Appl. No.: 15/733,891

(22) PCT Filed: Sep. 4, 2019

(86) PCT No.: PCT/CN2019/104455
§ 371 (c)(1),
(2) Date: Jun. 15, 2021

(87) PCT Pub. No.: WO2020/048497
PCT Pub. Date: Mar. 12, 2020

(65) Prior Publication Data
US 2021/0311699 A1 Oct. 7, 2021

(30) Foreign Application Priority Data
Sep. 4, 2018 (CN) .......................... 201811027787.5

(51) Int. Cl.
*G06F 3/16* (2006.01)
*G10L 15/04* (2013.01)
(Continued)

(52) U.S. Cl.
CPC .............. *G06F 3/167* (2013.01); *G06F 3/165* (2013.01); *G10L 15/04* (2013.01); *G10L 15/22* (2013.01); *G10L 15/30* (2013.01); *G10L 25/57* (2013.01)

(58) Field of Classification Search
CPC ......... G06F 3/165; G06F 3/167; G10L 15/04; G10L 25/57
See application file for complete search history.

(56) References Cited

U.S. PATENT DOCUMENTS 6,760,749 B1 * 7/2004 Dunlap .................. H04N 7/147
348/14.08
8,898,568 B2 * 11/2014 Bull ........................ G06F 3/167
715/727
(Continued)

FOREIGN PATENT DOCUMENTS

CN 104901820 A 9/2015
CN 105657482 A 6/2016
(Continued)

OTHER PUBLICATIONS

Office Action for Chinese Patent Application No. 201811027787.5, dated Apr. 19, 2019, 11 pages.
(Continued)

*Primary Examiner* — Daniel C Washburn
*Assistant Examiner* — Oluwadamilola M Ogunbiyi
(74) *Attorney, Agent, or Firm* — Foley & Lardner LLP

(57) ABSTRACT

A method for playing voice, which is applied to a webcast server, the method comprising: receiving voice data sent by at least one first electronic device for obtaining a voice data set, the first electronic device having a first preset authority, and the voice data set comprising at least one piece of the voice data; receiving audio-video data sent by a second electronic device, the second electronic device having a second preset authority, the audio-video data comprising the
(Continued)

voice data selected for playback, wherein the voice data selected for playback comprises any voice data of the voice data set clicked for playback; pushing the audio-video data to each first electronic device.

16 Claims, 8 Drawing Sheets

(51) Int. Cl.
*G10L 15/22* (2006.01)
*G10L 15/30* (2013.01)
*G10L 25/57* (2013.01)

(56) References Cited

U.S. PATENT DOCUMENTS

| | | | |
|---|---|---|---|
| 10,034,055 B2* | 7/2018 | van der Heide | H04N 21/4756 |
| 10,567,831 B2* | 2/2020 | Coburn, IV | H04L 29/06027 |
| 10,616,726 B1* | 4/2020 | Freeman, II | H04W 4/025 |
| 2005/0088526 A1* | 4/2005 | Wang | G01N 27/12 348/207.1 |
| 2005/0195978 A1* | 9/2005 | Babic | H04L 63/0428 380/231 |
| 2006/0104600 A1* | 5/2006 | Abrams | H04N 7/181 386/223 |
| 2011/0283236 A1* | 11/2011 | Beaumier | G06F 3/04847 715/835 |
| 2012/0005588 A1* | 1/2012 | Bastide | G06Q 10/10 715/741 |
| 2014/0173430 A1* | 6/2014 | Clavel | G06F 3/0481 715/716 |
| 2014/0245365 A1 | 8/2014 | Axelrod | |
| 2014/0359444 A1 | 12/2014 | Greenberg-Sanders et al. | |
| 2015/0172605 A1* | 6/2015 | Anwar | H04N 21/47202 348/159 |
| 2016/0029102 A1* | 1/2016 | Daily | H04N 21/4223 725/93 |
| 2016/0361646 A1* | 12/2016 | Perry | A63F 13/497 |
| 2016/0364123 A1* | 12/2016 | Burns | G06F 3/04842 |
| 2017/0024093 A1* | 1/2017 | Dziuk | G06F 3/04847 |
| 2017/0034263 A1* | 2/2017 | Archambault | H04L 67/1095 |
| 2017/0050110 A1* | 2/2017 | Perry | A63F 13/23 |
| 2017/0050111 A1* | 2/2017 | Perry | H04L 67/10 |
| 2017/0118597 A1* | 4/2017 | Swirsky | H04W 76/10 |
| 2017/0134831 A1* | 5/2017 | Talukder | H04L 65/1069 |
| 2017/0251182 A1* | 8/2017 | Siminoff | G08B 25/08 |
| 2017/0257646 A1 | 9/2017 | Wu | |
| 2017/0280112 A1* | 9/2017 | Siminoff | G08B 13/19684 |
| 2017/0371615 A1* | 12/2017 | Gummadi | G10L 25/84 |
| 2018/0157657 A1* | 6/2018 | Li | G06K 9/00469 |
| 2018/0234765 A1* | 8/2018 | Torok | G06F 3/167 |
| 2018/0280802 A1* | 10/2018 | Stroud | A63F 13/63 |
| 2019/0037173 A1* | 1/2019 | Lee | H04W 76/15 |
| 2019/0058908 A1* | 2/2019 | Orlowski | H04N 21/25 |
| 2019/0068569 A1* | 2/2019 | Beckhardt | H04N 21/4627 |
| 2019/0075364 A1* | 3/2019 | van der Heide | H04N 21/4756 |
| 2019/0132371 A1* | 5/2019 | Bhat | H04N 5/23203 |
| 2019/0278552 A1* | 9/2019 | Lyren | G06F 3/04847 |
| 2019/0373313 A1* | 12/2019 | Jackson | H04N 21/4432 |
| 2019/0387314 A1* | 12/2019 | Chavan | G10L 15/22 |
| 2019/0394589 A1* | 12/2019 | Starobin | G06F 3/0488 |
| 2020/0027470 A1* | 1/2020 | Thurman | H04R 3/12 |
| 2020/0043185 A1* | 2/2020 | Siminoff | G06F 3/0482 |
| 2020/0057603 A1* | 2/2020 | Sarir | G06F 3/167 |
| 2020/0278828 A1* | 9/2020 | Murtaza | H04N 21/21805 |
| 2021/0132895 A1* | 5/2021 | Cengarle | G06F 3/165 |
| 2021/0329403 A1* | 10/2021 | Vetter | G06F 3/165 |

FOREIGN PATENT DOCUMENTS

| | | |
|---|---|---|
| CN | 105721891 A | 6/2016 |
| CN | 105895609 A | 8/2016 |
| CN | 106534890 A | 3/2017 |
| CN | 109151565 A | 1/2019 |
| CN | 109151565 B | 12/2019 |

OTHER PUBLICATIONS

Notification to Grant for Chinese Patent Application No. 201811027787. 5, dated Nov. 21, 2019, 9 pages (with English Translation).
International Search Report from PCT/CN2019/104455 dated Nov. 4, 2019, 5 pages with English Translation.
Chinese Office Action from CN201811027787.5, dated Apr. 19, 2019, 31 pages with English translation.
Chinese Office Action from CN201811027787.5, dated Jun. 26, 2019, 16 pages with English translation.
Chinese Office Action from CN201811027787.5, dated Sep. 12, 2019, 9 pages with English translation.
Chinese Notification of Grant from CN201811027787.5, dated Nov. 21, 2019, 6 pages with English translation.
English translation of Allowed claims from CN201811027787.5, dated Nov. 21, 2019, 10 pages.

* cited by examiner

METHOD AND DEVICE FOR PLAYING VOICE, ELECTRONIC DEVICE, AND STORAGE MEDIUM

CROSS-REFERENCE TO RELATED APPLICATIONS

The present application is the 371 application of PCT Application No. PCT/CN2019/104455, filed on Sep. 4, 2019, which claims priority to Chinese patent application No. 201811027787.5 filed with China National Intellectual Property Administration on Sep. 4, 2018, the disclosures of which are incorporated herein by reference in their entireties.

TECHNICAL FIELD

The present disclosure relates to webcast technologies, and in particular to a method and device for playing voice, an electronic apparatus, and a storage medium.

BACKGROUND

In a real-time interactive webcast system, only one anchor but many audience members are in a live room in most cases. Therefore, the webcast system realizes an interactive communication scene with the anchor's video and audio expression as a center and one-to-many communication as a main mode, and it is necessary to ensure an equal relationship between the audiences. In such a mode, the audience members can only express themselves through texts.

However, the audience members may vary from each other. Some audience members type slowly or are even unable to input text, thus preventing such audience members from expressing their opinions effectively during the real-time interactive webcast and resulting in poor use experience. This is not conducive to expanding the audience coverage of the webcast.

SUMMARY

According to some arrangements of the present disclosure, a method for playing voice, which is applied to a webcast server, includes receiving voice data sent by at least one first electronic device to obtain a voice data set, where the first electronic device has a first preset authority, and the voice data set includes at least one piece of the voice data, receiving audio-video data sent by a second electronic device, where the second electronic device has a second preset authority, the audio-video data includes the voice data selected for playback, and the voice data selected for playback includes any voice data of the voice data set clicked for playback, and pushing the audio-video data to each first electronic device.

According to some arrangements of the present disclosure, a device for playing voice, which is applied to a webcast server, includes a first receiving module configured to receive voice data sent by at least one first electronic device to obtain a voice data set, where the first electronic device has a first preset authority, and the voice data set includes at least one piece of the voice data, a second receiving module configured to receive audio-video data sent by a second electronic device, where the second electronic device has a second preset authority, the audio-video data includes the voice data selected for playback, and the voice data selected for playback includes any voice data of the voice data set clicked for playback, and a first pushing module configured to push the audio-video data to each first electronic device.

According to some arrangements of the present disclosure, a method for playing voice, which is applied to a first electronic device connected to a webcast server, the first electronic device having a first preset authority, the method includes receiving audio-video data pushed by the server, the audio-video data including audio-video recorded by a second electronic device connected to the server and voice data of a voice data set selected for playback, where the second electronic device has a second preset authority, and the voice data set includes voice data uploaded by the first electronic device or another first electronic device, and playing the audio-video data.

According to some arrangements of the present disclosure, a device for playing voice, which is applied to a first electronic device connected to a webcast server, the first electronic device having a first preset authority, the device includes a first audio-video receiving module configured to receive audio-video data pushed by the server, the audio-video data including audio-video recorded by a second electronic device connected to the server and voice data of a voice data set selected for playback, where the second electronic device has a second preset authority, and the voice data set includes voice data uploaded by the first electronic device or another first electronic device, and a first audio-video playback module configured to play the audio-video data.

According to some arrangements of the present disclosure, a method for playing voice, which is applied to a second electronic device connected to a webcast server, the second electronic device having a second preset authority, the method includes in response to a selection and playback instruction of a user, playing target voice data indicated by the selection and playback instruction, receiving audio-video data acquired by an acquisition device connected to the second electronic device, playing the audio-video data which includes the target voice data, and sending the audio-video data to the server.

According to some arrangements of the present disclosure, a device for playing voice, which is applied to a second electronic device connected to a webcast server, the second electronic device having a second preset authority, the device includes a sixth response module configured to play target voice data indicated by a selection and playback instruction of a user in response to the selection and playback instruction, a second audio-video receiving module configured to receive audio-video data acquired by an acquisition device connected to the second electronic device, a second audio-video playback module configured to play the audio-video data which includes the target voice data, and an audio-video sending module configured to send the audio-video data to the server.

According to some arrangements of the present disclosure, a non-transitory computer-readable storage medium having stored therein instructions which, when being executed by a processor of a mobile terminal, cause the mobile terminal to perform a method for playing voice, the method includes receiving voice data sent by at least one first electronic device to obtain a voice data set, where the first electronic device is an electronic device having a first preset authority, and the voice data set includes at least one piece of the voice data, receiving video data sent by a second electronic device, where the second electronic device is an electronic device having a second preset authority, the audio-video data includes the voice data selected for playback, the voice data selected for playback includes any voice data of the voice data set clicked for playback, and pushing the audio-video data to each first electronic device.

According to some arrangements of the present disclosure, the present application provides a computer program that is applied to a webcast server, which, when being executed by a processor of a computer device, causes the computer device to perform a method of for playing back voice, which is applied to a webcast server, the method includes receiving voice data sent by at least one first electronic device to obtain a voice data set, where the first electronic device is an electronic device having a first preset authority, and the voice data set includes at least one piece of the voice data, receiving video data sent by a second electronic device, where the second electronic device is an electronic device having a second preset authority, the video data includes the voice data selected for playback, and the voice data selected for playback includes any voice data of the voice data set clicked for playback, and pushing the video data to each first electronic device.

According to some arrangements of the present disclosure, the present application provides a server that includes a processor and a memory for storing instructions executable by the processor. The processor is configured to revoke and execute the instructions stored in the memory to cause the serve to receive voice data sent by at least one first electronic device to obtain a voice data set, where the first electronic device has a first preset authority, and the voice data set includes at least one piece of the voice data, receive audio-video data sent by a second electronic device, where the second electronic device has a second preset authority, the audio-video data includes the voice data selected for playback, and the voice data selected for playback includes any voice data of the voice data set clicked for playback, and push the audio-video data to each first electronic device.

According to some arrangements of the present disclosure, an electronic device includes a processor and a memory for storing instructions executable by the processor. The processor is configured to revoke and execute the instructions stored in the memory to cause the electronic device to receive audio-video data pushed by the server, the audio-video data including audio-video recorded by a second electronic device connected to the server and voice data selected for playback from a voice data set, where the second electronic device has a second preset authority, and the voice data set includes voice data uploaded by the electronic device or another electronic device, and play the audio-video data.

It should be understood that the above general description and the following detailed description are only examples, and do not limit the present disclosure.

BRIEF DESCRIPTION OF THE DRAWINGS

The drawings which are incorporated into and constitute a part of the specification illustrate arrangements in accordance with the present application, and together with the specification, serve to explain principles of the arrangements of the present application.

DETAILED DESCRIPTION

Figure 1:
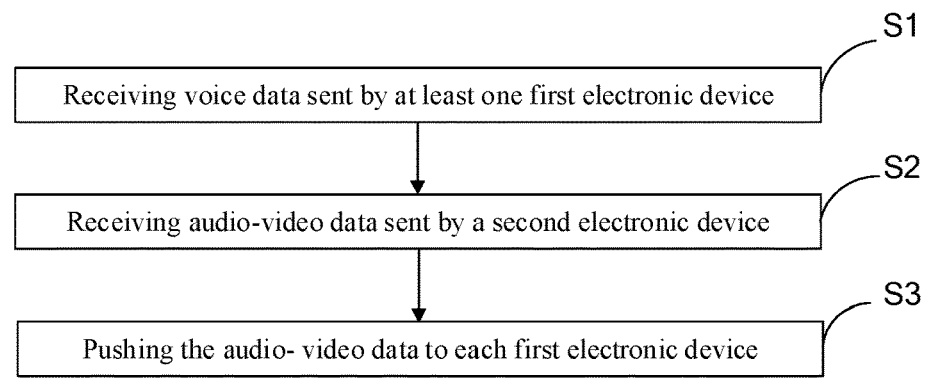
FIG. 1 is a flow chart showing a method for playing voice according to an example arrangement.

Example arrangements will be described in detail here, examples of which are illustrated in the accompanying drawings. When the following description refers to the accompanying drawings, same reference numerals in different drawings represent the same or similar elements unless otherwise indicated. The implementations described in the following example arrangements do not represent all implementations consistent with the arrangements of the present application. Rather, they are merely examples of devices and methods consistent with some aspects of the arrangements of the present application as detailed in the appended claims.

FIG. 1 is a flow chart showing a method for playing voice according to an example arrangement.

As shown in FIG. 1, the method for playing voice is applied to a webcast server, and specifically includes the following blocks.

In S1, voice data sent by at least one first electronic device is received.

The number of first electronic devices here is at least one, and generally there will be more than one first electronic devices, even hundreds or thousands of first electronic devices. In a specific arrangement, an audience end of the webcast system can be referred to as the first electronic device, and the first electronic device can be an actual physical device such as a mobile terminal or a personal computer, or an application in the above physical device.

In an actual process of the webcast, audience users interact with an anchor user on an anchor end through the first electronic devices, and when the audience users send voice data by the first electronic devices, the voice data is received. Since there are multiple audience users, there are multiple pieces of voice data being sent. Herein, there will also be multiple pieces of voice data received from the multiple first electronic devices, which constitute a voice data set.

The first electronic device herein has a first preset authority which is set in advance and matches a behavior of the audience user. The authority specifically includes a viewing authority and a comment input authority. Since the first electronic device has the viewing authority, it can play corresponding video and audio for the audience user, and since it has the comment input authority, it enables the audience user to input a voice signal under this authority and convert the voice signal into the voice data described above.

In S2, audio-video data sent by a second electronic device is received.

In a specific implementation, the second electronic device can be considered as the anchor end of the webcast system, which enables the anchor user to interact with the audience users on the audience ends through the second electronic device, that is, to send audio-video data through the second electronic device. The second electronic device has a second preset authority. For the webcast system, the second preset authority corresponds to the authority that the anchor user should have, including a recording authority, a playback authority, and an authority of selection for playback of the voice data set.

When the anchor user sends the audio-video data, the audio-video data received herein includes not only the audio data and video data acquired by the second electronic device itself, but also the voice data selected for playback. The voice data selected for playback refers to a certain piece or some pieces of voice data selected for playback by the anchor user from the voice data set after the voice data set is pushed to the second electronic device.

In S3, the audio-video data is pushed to each first electronic device.

Since the audio-video data herein includes not only the audio data and video data acquired by the second electronic device, but also the voice data selected for playback from the voice data set, when it is pushed to each first electronic device, it enables not only to watch and listen to the video and sound of the anchor through the first electronic device, but also to receive the sound sent by other audience users.

It can be seen from the above technical solutions that the arrangements of the present application provide a method for playing voice which specifically includes receiving voice data sent by a first electronic device to obtain a voice data set; receiving audio-video data sent by a second electronic device, the audio-video data including the voice data selected for playback, and the voice data selected for playback including any piece of voice data clicked for playback from the voice data set; and pushing the audio-video data to each first electronic device. For the webcast system, the audience users who use the first electronic devices can interact with the anchor user by way of voice, so that the audience users who type slowly or can't input text can also conveniently express their opinions in the webcast, thereby improving the use experience of the audience users and helping to expand the audience coverage of the webcast.

Figure 2:
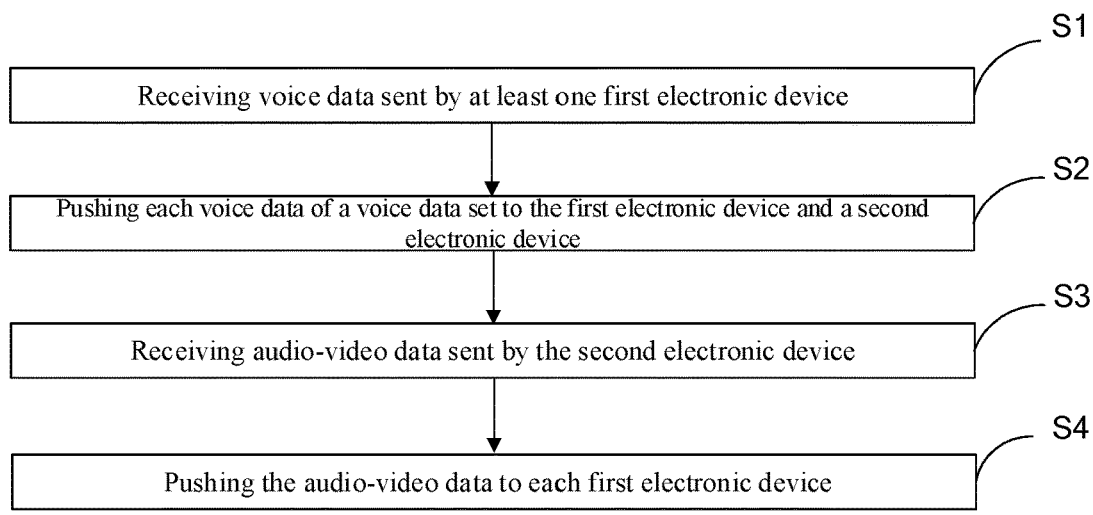
FIG. 2 is a flow chart showing another method for playing voice according to an example arrangement.

FIG. 2 is a flow chart showing another method for playing voice according to an example arrangement.

As shown in FIG. 2, the method for playing voice is applied to a webcast server, and specifically includes the following blocks.

In S1, voice data sent by at least one first electronic device is received.

The specific content of the S1 is the same as that of the corresponding block S1 in the previous arrangement, and will not be repeated here.

In S2, each piece of voice data in a voice data set is pushed to the first electronic device and a second electronic device.

After receiving the voice data sent by a certain or some first electronic devices and forming the voice data set, each piece of voice data in the voice data set is sequentially pushed to the second electronic device in the form of a single voice packet. For the webcast system, each piece of voice data is pushed to the anchor end in the form of the single voice packet, so that the anchor user can receive all the single voice packets through the anchor end, and can select corresponding voice data for playback through a selection operation.

At the same time, each piece of voice data in the voice data set is also pushed sequentially in the form of the single voice packet to other first electronic devices than the first electronic device that generates the pushed voice data, that is, to audience ends other than the audience end that generates the voice data, so that audience users of the other audience ends can obtain and listen to the voice data sent by other audience users.

In S3, audio-video data sent by the second electronic device is received.

The specific content of S3 is the same as that of the corresponding block S2 in the previous arrangement, and will not be repeated here.

In S4, the audio-video data is pushed to each first electronic device.

The specific content of S4 is the same as that of the corresponding block S3 in the previous arrangement, and will not be repeated here.

It can be seen from the foregoing technical solution that the arrangements of the present application provide a method for playing voice through which, for the webcast system, the audience users who use the first electronic devices can interact with the anchor user by way of voice, so that audience users who type slowly or are unable to input text can also conveniently express their opinions in the webcast, thereby improving the use experience of the audience users and helping to expand the audience coverage of the webcast.

Figure 3:
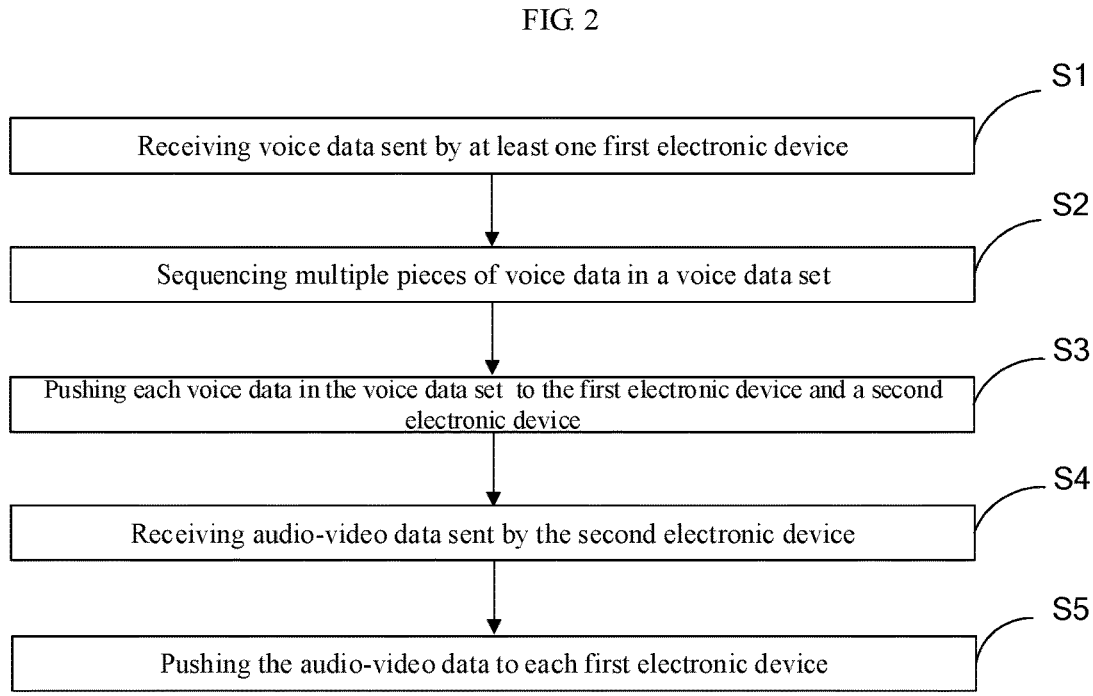
FIG. 3 is a flow chart showing still another method for playing voice according to an example arrangement.

FIG. 3 is a flow chart showing still another method for playing voice according to an example arrangement.

As shown in FIG. 3, the method for playing voice is applied to a webcast server, and specifically includes the following blocks.

In S1, voice data sent by at least one first electronic device is received.

The specific content of the S1 is the same as that of the corresponding block S1 in the previous arrangements, and will not be repeated here.

In the S2, multiple pieces of voice data in a voice data set are sequenced.

In the example in which multiple pieces of voice data are included in the voice data set, in order to perform the pushing in order, the multiple pieces of voice data are sequenced before being pushed, that is, sequenced according to a preset voice sequencing rule. The specific preset voice sequencing rule can include sequencing according to a sequence of sending time of the voice data, or according to a sequence of receiving time of the voice data. An order of the sequencing herein is not limited to sequencing the voice data with the earlier time in a higher rank, and the voice data with the earlier time can also be sequenced in a lower rank.

The preset voice sequencing rule can also include sequencing according to characteristic parameters of the user. The characteristic parameters herein can include parameters such as an online duration and an activity level, or a weight coefficient which is temporarily assigned. The weight coefficient can be a priority authority temporarily assigned to a certain or some audience users by the anchor user through a corresponding operation.

In particular, there may be the case where multiple pieces of voice data are sent at the same time and received at the same time. In this case, it is necessary to perform the sequencing according to the characteristic parameters of the users. There will be a very low probability that the three are all the same, and it can be said that such situation almost does not exist, and thus the sequencing can be performed effectively according to the above principles.

In S3, each piece of voice data in the voice data set is pushed to the first electronic device and a second electronic device.

Compared with the previous arrangement, the sequenced voice data in the voice data set is sequentially pushed to the second electronic device in the form of the single voice packet in this arrangement. As for the webcast system, each piece of voice data is pushed to the anchor end in the form of the single voice packet, so that the anchor user receives all the single voice packets through the anchor end, and can select corresponding voice data for playback through the selection operation.

At the same time, the sequenced voice data in the voice data set is also pushed sequentially in the form of the single voice packet to other first electronic devices than the one that generates the pushed voice data, that is, to the audience ends other than the audience end that generates the voice data, so that audience users of the other audience ends can obtain and listen to the voice data sent by other audience users.

In S4, audio-video data sent by the second electronic device is received.

The specific content of the S4 is the same as that of the corresponding block in the previous arrangements, and will not be repeated here.

In S5, the audio-video data is pushed to each first electronic device.

The specific content of the S5 is the same as that of the corresponding block in the previous arrangements, and will not be repeated here.

It can be seen from the foregoing technical solution that the arrangements of the present application provide a method for playing voice through which, for the webcast system, the audience users who use the first electronic devices can interact with the anchor user by way of voice, so that audience users who type slowly or are unable to input text can also conveniently express their opinions in the webcast, thereby improving the use experience of the audience users and helping to expand the audience coverage of the webcast.

Figure 4:
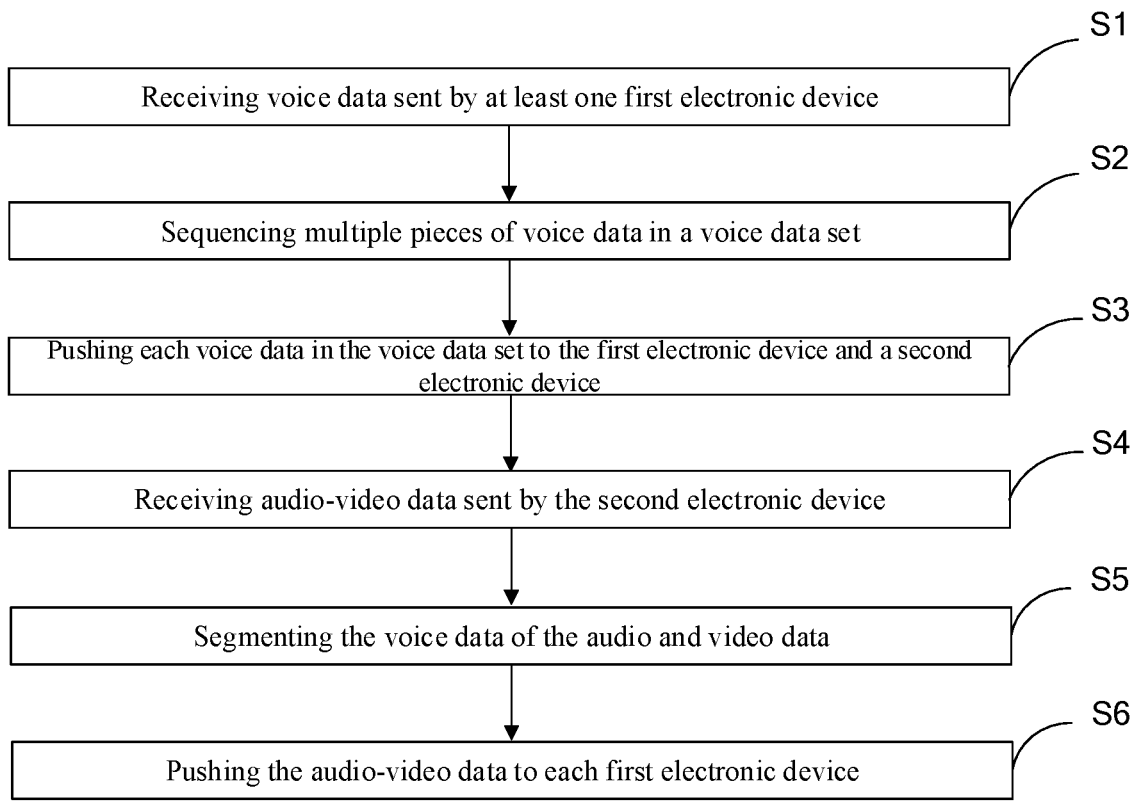
FIG. 4 is a flow chart showing still another method for playing voice according to an example arrangement.

FIG. 4 is a flow chart showing still another method for playing voice according to an example arrangement.

As shown in FIG. 4, the method for playing voice is applied to a webcast server, and specifically includes the following blocks.

In S1, voice data sent by at least one first electronic device is received.

The specific content of the S1 is the same as that of the corresponding block S1 in the previous arrangements, and will not be repeated here.

In the S2, multiple pieces of voice data in a voice data set are sequenced.

The specific content of the S2 is the same as that of the corresponding block S2 in the previous arrangement shown in FIG. 3, and will not be repeated here.

In S3, each piece of voice data in the voice data set is pushed to the first electronic device and a second electronic device.

The specific content of the S3 is the same as that of the corresponding block in the previous arrangements, and will not be repeated here.

In S4, audio-video data sent by the second electronic device is received.

The specific content of the S4 is the same as that of the corresponding block in the previous arrangements, and will not be repeated here.

In S5, the voice data in the audio-video data is segmented.

For the webcast system, this specifically refers to segmenting the voice data in the audio-video data into first audio voice data originating from the audience end which can specifically be the voice data selected for playback from the voice data set, and voice data originating from and recorded by the anchor end.

In S6, the audio-video data is pushed to each first electronic device.

The specific content is basically the same as that of the corresponding block in the previous arrangements, and only the difference is described here. The difference from the corresponding blocks in the previous arrangement lies in that that the audio-video data including first audio voice data and second audio voice data is pushed to all the first electronic devices, and at the same time, when the first electronic devices play the audio-video data, the second audio voice data is controlled to be played back at a low playback volume, so that it is played back at the volume lower than that of the first audio voice data, thereby enabling the audience users to distinguish between the sound of the two, more precisely, enabling other audience users to hear the voice data sent by the corresponding audience user.

It can be seen from the foregoing technical solution that the arrangements of the present application provide a method for playing voice through which, for the webcast system, the audience users who use the first electronic devices can interact with the anchor user by way of voice, so that audience users who type slowly or are unable to input text can also conveniently express their opinions in the webcast, thereby improving the use experience of the audience users and helping to expand the audience coverage of the webcast.

In addition, the arrangements of the present application can include the following blocks:

deleting the voice data according to a cancellation request of the user.

Specifically, when the user of the first electronic device finds that the sent voice data is unsatisfactory or is sent by mistake, he or she can send a corresponding cancellation request through the first electronic device, and in response to the cancellation request here, the voice data corresponding to the cancellation request can be deleted according to the cancellation request, so to meet the user's requirements for deletion.

It can also include the following blocks:

in response to a control request sent by the second electronic device which includes a deletion request or a loop playback request sent by the anchor user of the second electronic device for the webcast system, in response to determining that the deletion request is received, deleting the voice data corresponding to the deletion request. In response to determining that the loop playback request is received, the voice data corresponding to the loop playback request is played in a loop.

Figure 5:
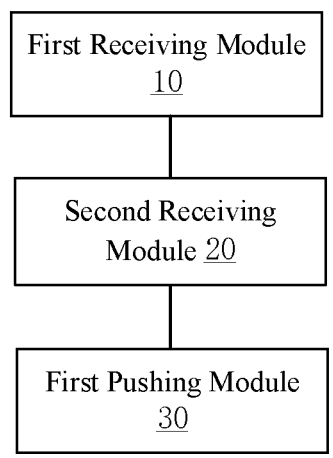
FIG. 5 is a structural block diagram showing a device for playing voice according to an example arrangement.

FIG. 5 is a structural block diagram showing a device for playing voice according to an example arrangement.

As shown in FIG. 5, the device for playing voice is applied to the webcast server, and the device specifically includes a first receiving module 10, a second receiving module 20, and a first pushing module 30.

The first receiving module 10 is configured to receive voice data sent by at least one first electronic device.

The number of first electronic devices here is at least one, and generally there will be more than one first electronic devices, even hundreds or thousands of first electronic devices. In a specific arrangement, an audience end of the webcast system can be referred to as the first electronic device, and the first electronic device can be an actual physical device such as a mobile terminal or a personal computer, or an application in the above physical device.

In an actual process of the webcast, audience users interact with an anchor user on an anchor end through the first electronic devices, and when the audience users send voice data through the first electronic devices, the voice data is received. Since there are multiple audience users, there are multiple pieces of voice data being sent. Herein, there will also be multiple pieces of voice data received from the multiple first electronic devices, which constitute a voice data set.

The first electronic device herein has a first preset authority which is set in advance and matches a behavior of the audience user. The authority specifically includes a viewing authority and a comment input authority. Since the first electronic device has the viewing authority, it can play corresponding video and audio for the audience user, and since it has the comment input authority, it enables the audience user to input a voice signal under this authority and convert the voice signal into the voice data described above.

The second receiving module 20 is configured to receive audio-video data sent by the second electronic device.

In a specific implementation, the second electronic device can be considered as the anchor end of the webcast system, which enables the anchor user to interact with the audience users on the audience ends through the second electronic device, that is, to send audio-video data through the second electronic device. The second electronic device has a second preset authority. For the webcast system, the second preset authority corresponds to the authority that the anchor user should have, including a recording authority, a playback authority, and an authority of selection for playback of the voice data set.

When the anchor user sends the audio-video data, the audio-video data received herein includes not only the audio data and video data acquired by the second electronic device itself, but also the voice data selected for playback. The voice data selected for playback refers to a certain piece or some pieces of voice data selected for playback by the anchor user from the voice data set after the voice data set is pushed to the second electronic device.

The first pushing module is configured to push the audio-video data to each first electronic device.

Since the audio-video data here include not only the audio data and video data acquired by the second electronic device, but also the voice data selected for playback from the voice data set, when it is pushed to each first electronic device, it enables not only to watch and listen to the video and sound of the anchor through the first electronic device, but also to receive the sound sent by other audience users.

It can be seen from the above technical solutions that the arrangements of the present application provide a device for playing voice which is specifically configured to receive voice data sent by a first electronic device to obtain a voice data set; receive audio-video data sent by a second electronic device, the audio-video data including the voice data selected for playback, and the voice data selected for playback including any piece of voice data clicked for playback from the voice data set; and push the audio-video data to each first electronic device. For the webcast system, the audience users who use the first electronic devices can interact with the anchor user by way of voice, so that the audience users who type slowly or can't input text can also conveniently express their opinions in the webcast, thereby improving the use experience of the audience users and helping to expand the audience coverage of the webcast.

Figure 6:
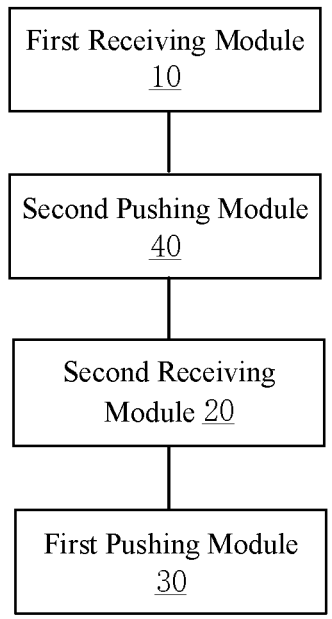
FIG. 6 is a structural block diagram showing another device for playing voice according to an example arrangement.

FIG. 6 is a structural block diagram showing another device for playing voice according to an example arrangement.

As shown in FIG. 6, the device for playing voice is applied to the webcast server. Compared with the previous arrangement, this device further includes a second pushing module 40.

The second pushing module 40 is configured to push each piece of voice data in the voice data set to the first electronic device and the second electronic device.

After receiving the voice data sent by a certain or some first electronic devices and forming the voice data set, each piece of voice data in the voice data set is sequentially pushed to the second electronic device in the form of a single voice packet. For the webcast system, each piece of voice data is pushed to the anchor end in the form of the single voice packet, so that the anchor user can receive all the single voice packets through the anchor end, and can select corresponding voice data for playback through a selection operation.

At the same time, each piece of voice data in the voice data set is also pushed sequentially in the form of the single voice packet to other first electronic devices than the one that generates the pushed voice data, that is, to other audience ends than the audience end that generates the voice data, so that audience users of the other audience ends can obtain and listen to the voice data sent by other audience users.

Figure 7:
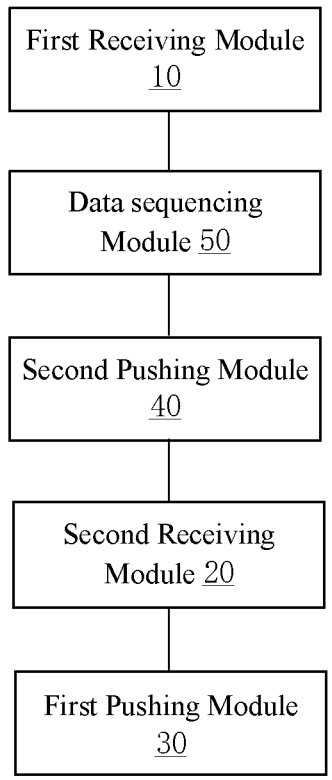
FIG. 7 is a structural block diagram showing still another device for playing voice according to an example arrangement.

FIG. 7 is a structural block diagram showing still another device for playing voice according to an example arrangement.

As shown in FIG. 7, the device for playing voice is applied to the webcast server. Compared with the previous arrangement, the device further includes a data sequencing module 50.

The data sequencing module 50 is configured to sequence multiple pieces of voice data in the voice data set.

When multiple pieces of voice data are included in the voice data set, in order to perform the pushing in order, the multiple pieces of voice data are sequenced before being pushed, that is, sequenced according to a preset voice sequencing rule. The specific preset voice sequencing rule can include sequencing according to a sequence of sending time of the voice data, or according to a sequence of receiving time of the voice data. An order of the sequencing herein is not limited to sequencing the voice data with the earlier time in a higher rank, and the voice data with the earlier time can also be sequenced in a lower rank.

The preset voice sequencing rule can also include sequencing according to characteristic parameters of the user. The characteristic parameters herein can include parameters such as an online duration and an activity level, or a weight coefficient which is temporarily assigned. For example, the sequencing can be performed according to a priority temporarily assigned to a certain or some audience users by the anchor user through a corresponding operation.

In the present arrangement, the second pushing module 40 is configured to push the sequenced voice data in the voice data set sequentially to the second electronic device in the form of the single voice packet in this arrangement, that is, push each piece of voice data to the anchor end in the form of the single voice packet for the webcast system, so that the anchor user receives all the single voice packets through the anchor end, and can select corresponding voice data for playback through the selection operation.

At the same time, the sequenced voice data in the voice data set is also pushed sequentially in the form of the single voice packet to other first electronic devices than the one that generates the pushed voice data, that is, to the audience ends other than the audience end that generates the voice data, so that audience users of the other audience ends can obtain and listen to the voice data sent by other audience users.

Figure 8:
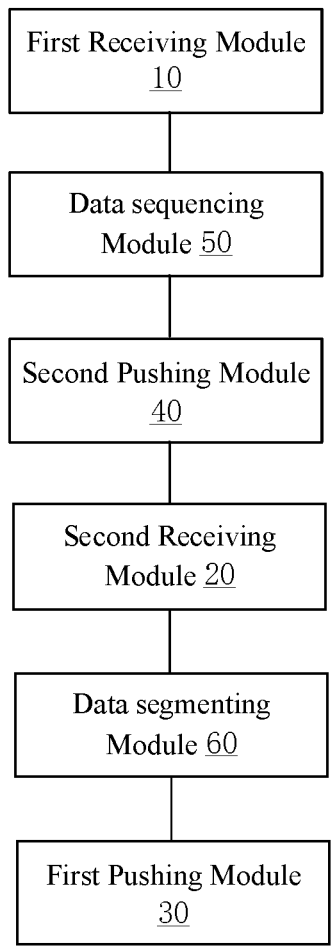
FIG. 8 is a structural block diagram showing still another device for playing voice according to an example arrangement.

FIG. 8 is a structural block diagram showing still another device for playing voice according to an example arrangement.

As shown in FIG. 8, the device for playing voice is applied to the webcast server. Compared with the previous arrangement, this device is further provided with a data segmentation module 60.

The data segmentation module is configured to perform segmentation process on the voice data in the audio-video data before the audio-video data is pushed to the first electronic device.

For the webcast system, this specifically refers to segmenting the voice data in the audio-video data into first audio voice data originating from the audience end which can specifically be the voice data selected for playback from the voice data set, and voice data originating from and recorded by the anchor end.

Correspondingly, the first pushing module 30 is configured to push the segmented audio-video data to each first electronic device.

The specific content is basically the same as that of the corresponding block in the previous arrangements, and only the difference is described here. The difference from the corresponding blocks in the previous arrangement lies in that that the audio-video data including first audio voice data and second audio voice data is pushed to all the first electronic devices, and at the same time, when the first electronic devices play the audio-video data, the second audio voice data is controlled to be played back at a low playback volume, so that it is played back at the volume lower than that of the first audio voice data, thereby enabling the audience users to distinguish between the sound of the two, and more precisely, enabling other audience users to hear the voice data sent by the corresponding audience user.

In addition, the arrangement of the present application may further include a first response module and a second response module.

The first response module is configured to delete the voice data according to a cancellation request of the user.

Specifically, when the user of the first electronic device finds that the sent voice data is unsatisfactory or is sent by mistake, he or she can send a corresponding cancellation request through the first electronic device, and in response to the cancellation request here, the voice data corresponding to the cancellation request can be deleted according to the cancellation request, so to meet the user's requirements for deletion.

The second response module is configured to, in response to a control request sent by the second electronic device which includes a deletion request or a loop playback request sent by the anchor user of the second electronic device for the webcast system, when the deletion request is received, delete the voice data corresponding to the deletion request, and when the loop playback request is received, play the voice data corresponding to the loop play request in a loop.

Figure 9A:
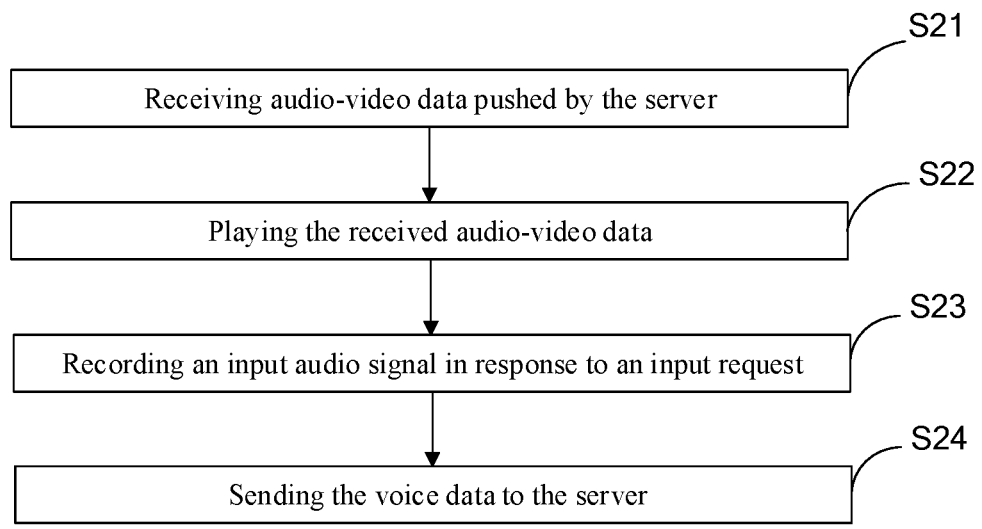
FIG. 9a is a flow chart showing still another method for playing voice according to an example arrangement.

FIG. 9a is a flow chart showing still another method for playing voice according to an example arrangement As shown in FIG. 9a, the method provided in the arrangement of the present application is applied to a first electronic device connected to a webcast server, and the first electronic device can be specifically understood as an audience end of the webcast.

The method for playing voice specifically includes the following blocks.

In S21, audio-video data pushed by the server is received.

The audio-video data includes the audio-video recorded by a second electronic device connected to the server and voice data selected for playback from a voice data set. The second electronic device has a second preset authority, and the voice data set includes at least one piece of voice data uploaded by the first electronic device or another first electronic device. The first electronic device has a first preset authority.

The first preset authority includes a viewing authority and a comment input authority, and the second preset authority includes a recording authority, a playback authority, and an authority of selection for playback of the voice data set.

In S22, the received audio-video data is played back.

The audio-video data includes first audio voice data and second audio voice data obtained by segmenting the voice data. Therefore, playing the audio-video data here refers to playing the first audio voice data and the second audio voice data, and playing the second audio voice data at a volume lower than that of the first audio voice data.

By performing the above operations, the audience users can interact with the anchor user on the anchor end by way of voice, eliminating the trouble of typing.

In addition, it also includes the following blocks.

In S23, an input audio signal is recorded in response to an input request.

The aforementioned voice data is formed by recording the audio signal input by the user.

In S24, the voice data is sent to the server.

By sending the voice data to the server, the server will collect the voice data into the voice data set.

It also includes the following block of:

in response to an cancellation operation, cancelling the instruction to the server.

The cancel instruction is generated according to the cancel operation input by the user, and is used for controlling the server to delete the voice data that has been uploaded.

It also includes the following block of:

after receiving the audio-video data pushed by the server, displaying each piece of audio data in the audio-video data on a display interface in a form of a voice icon.

On this basis, it also includes the following blocks of:

in response to a voice display command input by clicking or dragging the voice icon, playing the voice data indicated by the voice icon; and reducing a playback volume of a precious playback content, and restoring the playback volume of the previous playback content to a previous level when the playback of the voice data indicated by the voice icon is completed.

Figure 9B:
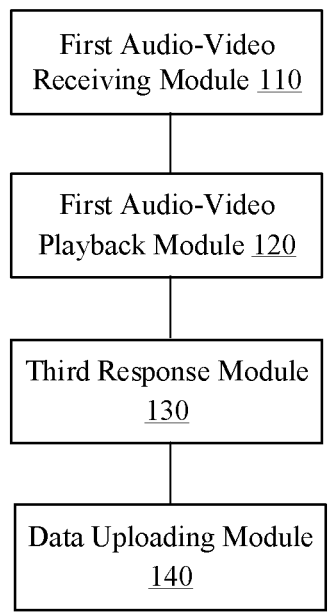
FIG. 9b is a structural block diagram showing still another device for playing voice according to an example arrangement.

FIG. 9b is a structural block diagram showing still another device for playing voice according to an example arrangement.

As shown in FIG. 9a, the device provided in the arrangement of the present application is applied to a first electronic device connected to a webcast server, and the first electronic device can be specifically understood as an audience end of the webcast.

The device for playing voice specifically includes a first audio-video receiving module 110, a first audio-video playback module 120, a third response module 130, and a data uploading module 140.

The first audio-video receiving module 110 is configured to receive audio-video data pushed by the server.

The audio-video data includes the audio-video recorded by a second electronic device connected to the server and voice data selected for playback from a voice data set. The second electronic device has a second preset authority, and the voice data set includes at least one piece of voice data uploaded by the first electronic device or another first electronic device. The first electronic device has a first preset authority.

The first preset authority includes a viewing authority and a comment input authority, and the second preset authority includes a recording authority, a playback authority, and an authority of selection for playback of the voice data set.

The first audio-video playback module 120 is configured to play the received audio-video data.

The audio-video data includes first audio voice data and second audio voice data obtained by segmenting the voice data. Therefore, playing the audio-video data here refers to playing the first audio voice data and the second audio voice data, and playing the second audio voice data at a volume lower than that of the first audio voice data.

By performing the above operations, the audience users can interact with the anchor user on the anchor end by way of voice, eliminating the trouble of typing.

The third response module 130 is configured to record an audio signal input by the user in response to an input request.

The voice data is formed by recording the audio signal input by the user.

The data uploading module 140 is configured to send the voice data to the server.

By sending the voice data to the server, the server will collect the voice data into the voice data set.

In addition, in the present arrangement, it further includes a fourth response module.

The fourth response module is configured to cancel an instruction to the server in response to a cancellation operation input by the user.

The cancellation instruction is generated according to the cancellation operation input by the user, and is used for controlling the server to delete the voice data that has been uploaded.

In addition, it can also include an icon display module, a fifth response module, and a volume control module.

The icon display module is configured to display each piece of audio data in the audio-video data on a display interface in a form of a voice icon after the audio-video data pushed by the server is received.

On this basis, the fifth response module is configured to play the voice data indicated by the voice icon in response to a voice command input by clicking or dragging the voice icon by the user.

The volume control module is configured to reduce a playback volume of a previous playback content, and to restore the playback volume of the previous playback content to a previous level when the playback of the voice data indicated by the voice icon is completed.

Figure 10A:
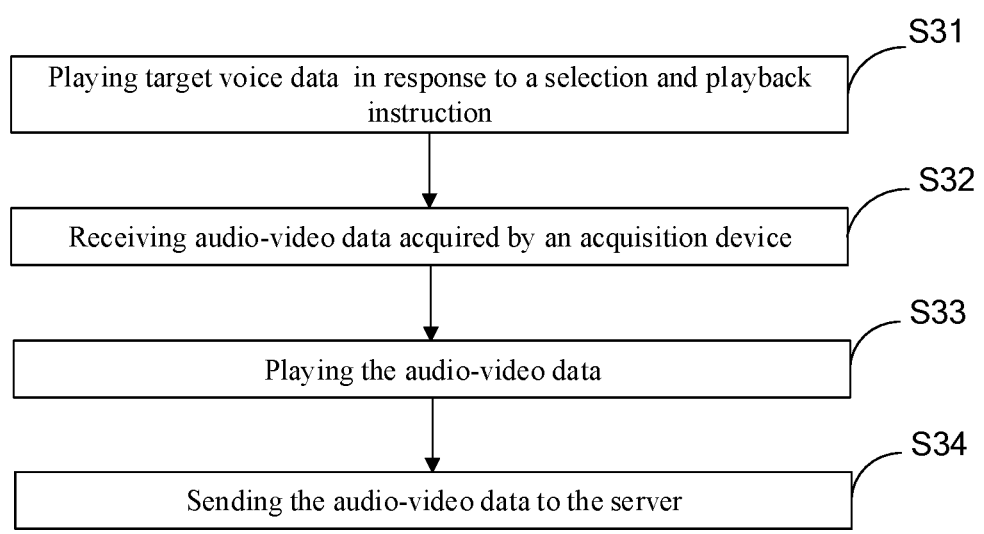
FIG. 10a is a flow chart showing still another method for playing voice according to an example arrangement.

FIG. 10a is a flow chart showing still another method for playing voice according to an example arrangement.

As shown in FIG. 10a, the method provided in the arrangement of the present application is applied to a second electronic device which is connected to a webcast server, and the second electronic device has a second preset authority. The method specifically includes the following blocks.

In S31, target voice data is played back in response to a selection and playback instruction.

When the user issues the selection and playback instruction, the target voice data indicated by the instruction is played back. The target voice data is any piece of voice data in a voice data set, and the voice data set includes at least one piece of voice data received by the server from at least one first electronic device which has a first preset authority.

In S32, audio-video data acquired by an acquisition device is received.

The acquisition device here can be considered as an audio recording device and/or a video recording device which are connected to the second electronic device and used for acquiring the video and audio of the anchor user.

In S33, the audio-video data is played back.

The audio-video data here includes the target voice data as described above.

In S34, the audio-video data is sent to the server.

Accordingly, the server pushes the corresponding voice data to the first electronic device connected thereto. The first electronic device can be regarded as the electronic device where the audience end connected to the webcast server is located. The first electronic device has the first preset authority. Correspondingly, the first preset authority includes the viewing authority and the comment input authority, and the second preset authority includes the recording authority, the playback authority, and the authority of selection for playback of the voice data set.

The method also includes the following blocks of:

segmenting the voice data in the audio-video data to obtain first audio voice data and second audio voice data, the first audio voice data including the target voice data, and the second audio voice data including the voice data acquired by the acquisition device; and playing the first audio voice data and the second audio voice data in response to the selection and playback instruction of the user, and controlling a playback volume of the second audio voice data to be lower than the playback volume of the first audio voice data during the playback.

In response to a control instruction of the user, the target voice data is deleted or played back in a loop, or the voice data in the audio-video data is deleted.

Figure 10B:
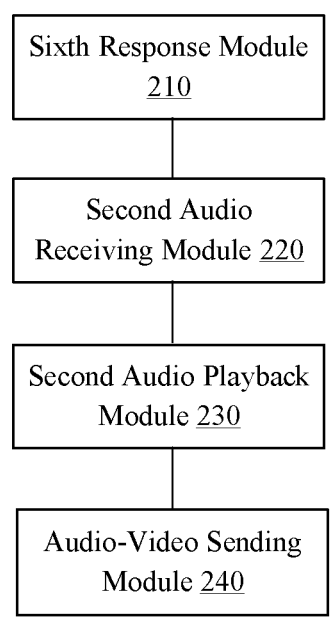
FIG. 10b is a structural block diagram showing still another device for playing voice according to an example arrangement.

FIG. 10b is a structural block diagram showing still another device for playing voice according to an example arrangement.

As shown in FIG. 10b, the device provided in this arrangement of the present application is applied to a second electronic device which is connected to a webcast server and which has a second preset authority. The device specifically includes a sixth response module 210, a second audio-video receiving module 220, a second audio-video playback module 230, and an audio-video sending module 240.

The sixth response module 210 is configured to play target voice data in response to a selection and playback instruction of a user.

When the user issues the selection and playback instruction, the target voice data indicated by the instruction is played back. The target voice data is any piece of voice data in a voice data set, and the voice data set includes at least one piece of voice data received by the server from at least one first electronic device which has a first preset authority.

The second audio-video receiving module 220 is configured to receive audio-video data acquired by an acquisition device.

The acquisition device here can be considered as an audio recording device and/or a video recording device which are connected to the second electronic device and used for acquiring the video and audio of the anchor user.

The second audio-video playback module is configured to play the audio-video data.

The audio-video data here includes the target voice data as described above.

The audio-video sending module is configured to send the audio-video data to the server.

Accordingly, the server pushes the corresponding voice data to the first electronic device connected thereto. The first electronic device can be regarded as the electronic device where the audience end connected to the webcast server is located. The first electronic device has the first preset authority. Correspondingly, the first preset authority includes the viewing authority and the comment input authority, and the second preset authority includes the recording authority, the playback authority, and the authority of selection for playback of the voice data set.

The device also includes a voice segmentation module, a seventh response module, and an eighth response module.

The voice segmentation module is configured to segment the voice data in the audio-video data to obtain first audio voice data and second audio voice data, the first audio voice data including the target voice data, and the second audio voice data including the voice data acquired by the acquisition device.

The seventh response module is configured to play the first audio voice data and the second audio voice data in response to a selection and playback instruction of the user, and to control a playback volume of the second audio voice data to be lower than the playback volume of the first audio voice data during the playback.

The eighth response module is configured to delete the target voice data, play the target voice data in a loop, or delete the voice data in the audio-video data in response to a control instruction of the user.

In addition, the present application also provides a computer program that can be executed by a server. The specific flow of the computer program is as shown in FIG. 1, including the following specific blocks of:

receiving voice data sent by at least one first electronic device to obtain a voice data set, where the first electronic device has a first preset authority, and the voice data set includes at least one piece of the voice data;

receiving audio-video data sent by a second electronic device, where the second electronic device has a second preset authority, the audio-video data includes the voice data selected for playback, and the voice data selected for playback includes any piece of voice data clicked for playback from the voice data set; and pushing the audio-video data to each first electronic device.

Figure 11:
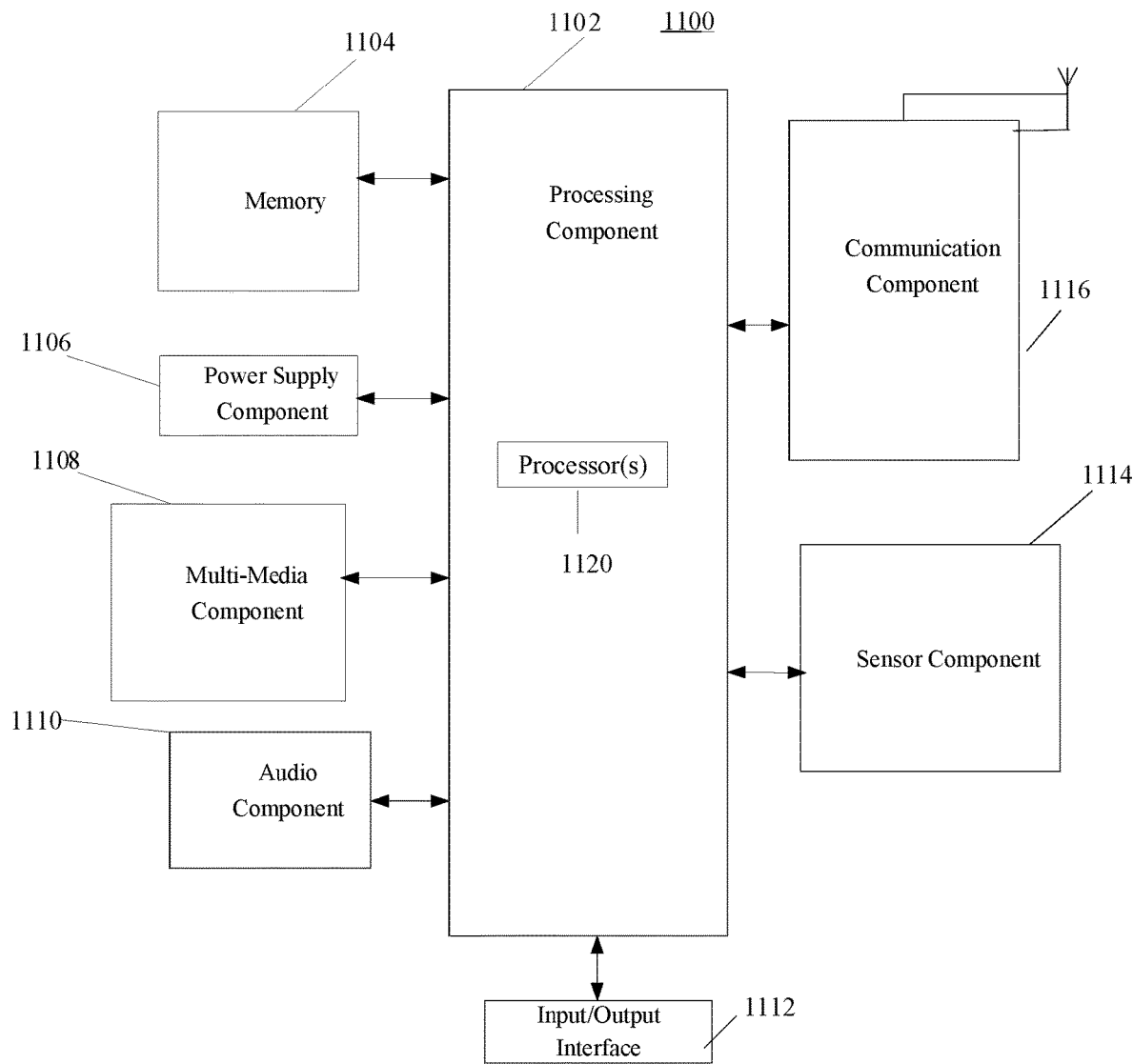
FIG. 11 is a structural block diagram showing a device for playing voice according to an example arrangement.

FIG. 11 is a structural block diagram showing a device for playing voice according to an example arrangement. For example, the device 1100 may be a mobile phone, a computer, a digital broadcasting terminal, a messaging device, a game console, a tablet, a medical device, a fitness device, a personal digital assistant, etc.

With reference to FIG. 11, the device 1100 may include one or more of a processing component 1102, a memory 1104, a power supply component 1106, a multi-media component 1108, an audio component 1110, an input/output (I/O) interface 1112, a sensor component 1114, and a communication component 1116.

The processing component 1102 generally controls overall operations of the device 1100, such as operations associated with display, telephone calls, data communications, camera operations, and recording operations. The processing component 1102 may include one or more processors 1120 to execute instructions so as to implement all or part of the blocks of the foregoing methods. In addition, the processing component 1102 may include one or more modules to facilitate the interaction between the processing component 1102 and other components. For example, the processing component 1102 may include a multi-media module to facilitate the interaction between the multi-media component 1108 and the processing component 1102.

The memory 1104 is configured to store various types of data to support operations on the device 1100. Examples of the data include instructions for any application or method operating on the device 1100, contact data, phone book data, messages, pictures, videos, etc. The memory 1104 can be implemented in any type of volatile or non-volatile storage device, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a magnetic disk and an optical disk, or a combination thereof.

The power supply component 1106 provides power to various components of the device 1100. The power supply component 1106 may include a power management system, one or more power supplies, and other components associated with generating, managing, and distributing power for the device 1100.

The multi-media component 1108 includes a screen that provides an output interface between the device 1100 and the user. In some arrangements, the screen may include a Liquid Crystal Display (LCD) or a Touch Panel (TP). When the screen includes the touch panel, the screen can be implemented as a touch screen for receiving input signals from the user. The touch panel includes one or more touch sensors to sense gestures such as touching and sliding on the touch panel. The touch sensor can not only sense a boundary of the touching or sliding operation, but also detect a duration and pressure associated with the touching or sliding operation. In some arrangements, the multi-media component 1108 includes a front camera and/or a rear camera. When the device 1100 is in an operation mode, such as a shooting mode or a video recording mode, the front camera and/or the rear camera can receive external multi-media data. Each of the front camera and the rear camera can be a fixed optical lens system or have focusing and optical zooming capabilities.

The audio component 1110 is configured to output and/or input audio signals. For example, the audio component 1110 includes a microphone (MIC). When the device 1100 is in an operation mode, such as a call mode, a recording mode or a voice recognition mode, the microphone is configured to receive external audio signals. The received audio signals may be further stored in the memory 1104 or sent via the communication component 1116. In some arrangements, the audio component 1110 further includes a speaker for outputting the audio signals.

The I/O interface 1112 provides an interface between the processing component 1102 and peripheral interface modules. The peripheral interface modules may be a keyboard, a click wheel, a button, or the like. The button may include but is not limited to a home button, a volume button, a start button, and a lock button.

The sensor component 1114 includes one or more sensors for providing various state evaluations of the device 1100. For example, the sensor component 1114 can detect an on/off state of the device 1100 and relative positioning of a component such as a display or a keypad of the device 1100. The sensor component 1114 can also detect a position change of the device 1100 or a component of the device 1100, presence or absence of contact with the device 1100 by the user, orientation or acceleration/deceleration of the device 1100, and temperature changes of the device 1100. The sensor component 1114 may include a proximity sensor configured to detect presence of a nearby object without any physical contact. The sensor component 1114 may also include an optical sensor, such as a CMOS or CCD image sensor, for use in imaging applications. In some arrangements, the sensor component 1114 may also include an acceleration sensor, a gyroscope sensor, a magnetic sensor, a pressure sensor or a temperature sensor.

The communication component 1116 is configured to facilitate wired or wireless communication between the device 1100 and other devices. The device 1100 can access a wireless network based on a communication standard, such as a Wi-Fi, an operator network (e.g., 2G, 3G, 4G, or 5G), or a combination thereof. In an example arrangement, the communication component 1116 receives a broadcast signal or broadcast related information from an external broadcast management system via a broadcast channel. In an example arrangement, the communication component 1116 further includes a Near Field Communication (NFC) module to facilitate short-range communication. For example, the NFC module can be implemented based on a Radio Frequency Identification (RFID) technology, an infrared Data Association (IrDA) technology, an Ultra-Wideband (UWB) technology, a Bluetooth (BT) technology or other technologies.

In an example arrangement, the device 1100 may be implemented by one or more application specific integrated circuits (ASICs), digital signal processors (DSPs), digital signal processing devices (DSPDs), programmable logic devices (PLDs), field programmable gate arrays (FPGAs), controllers, microcontrollers, microprocessors, or other electronic components to perform the operations as shown in FIG. 1, FIG. 2, FIG. 3, FIG. 4, FIG. 9a, or FIG. 10a.

In an example arrangement, there is also provided a non-transitory computer-readable storage medium including instructions, such as the memory 1104 including instructions. The instructions can be executed by the processor 1120 of the device 1100 to carry out the foregoing methods. For example, the non-transitory computer-readable storage medium may be a ROM, a Random Access Memory (RAM), a CD-ROM, a magnetic tape, a floppy disk, an optical data storage device, etc.

The present application also provides a computer program which includes the operation blocks as shown in FIG. 1, FIG. 2, FIG. 3, FIG. 4, FIG. 9a, or FIG. 10a.

Figure 12:
FIG. 12 is a structural block diagram showing a server according to an example arrangement.

FIG. 12 is a structural block diagram showing a server according to an example arrangement.

As shown in FIG. 12, the server is provided with at least one processor 1201, and also includes a memory 1202, and the two are connected by a data bus 1203.

The memory is used to store a computer program or instruction, and the processor is configured to obtain and execute the computer program or the instruction to cause the electronic device to perform the operations as shown in FIG. 1, FIG. 2, FIG. 3, or FIG. 4.

Figure 13:
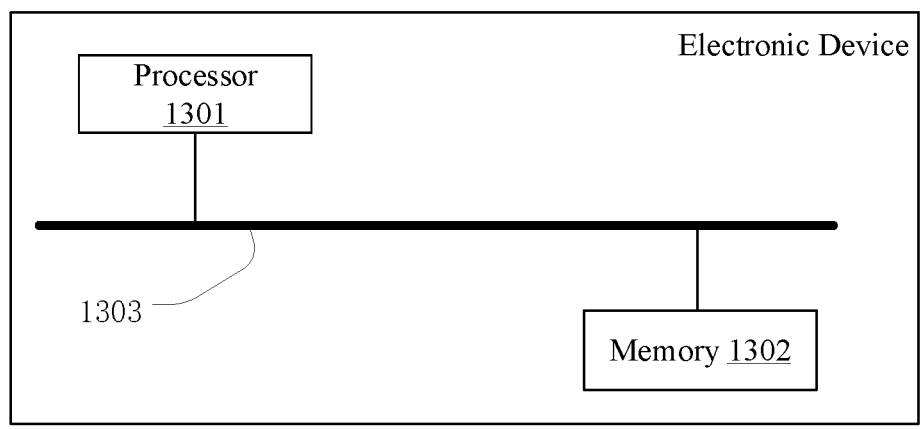
FIG. 13 is a structural block diagram of an electronic device according to an example arrangement.

FIG. 13 is a structural block diagram of an electronic device according to an example arrangement.

As shown in FIG. 13, the electronic device is provided with at least one processor 1301, and also includes a memory 1302, and the two are connected through a data bus 1303. The memory is used to store a computer program or instruction, and the processor is configured to obtain and execute the computer program or instruction to cause the electronic device to perform the operations as shown in FIG. 9a or FIG. 10a below.

What is claimed is:

1. A method for playing voice, which is applied to a webcast server, the method comprising:
   obtaining a voice data set based on received voice data sent by at least one first electronic device, the first electronic device having a first preset authority, and the voice data set comprising at least one piece of the voice data;
   pushing the voice data in the voice data set to a second electronic device;
   receiving audio-video data sent by the second electronic device, the second electronic device having a second preset authority, the audio-video data comprising voice data selected by a user of the second electronic device for playback, wherein the voice data selected by the user for playback comprises any voice data of the voice data set clicked by the user for playback;
   pushing the audio-video data to each first electronic device; and
   in response to receiving the audio-video data sent by the second electronic device, obtaining first audio voice data and second audio voice data by segmenting the voice data of the audio-video data, the first audio voice data comprising the voice data selected by the user of the second electronic device for playback, and the second audio voice data comprising voice data recorded by the second electronic device;
   wherein said pushing the audio-video data to each first electronic device comprises:
   pushing the audio-video data including the first audio voice data and the second audio voice data to the first electronic device; and
   controlling a playback volume of the second audio voice data lower than a playback volume of the first audio voice data in response to the first electronic device playing the audio-video data.

2. The method of claim 1, wherein the first preset authority comprises a viewing authority and a comment input authority, and the second preset authority comprises a recording authority, a playback authority, and an authority of selection for playback of the voice data set.

3. The method of claim 1, further comprising:
   pushing each voice data of the voice data set to the second electronic device sequentially in a single voice packet to enable the second electronic device to display a voice icon of the single voice packet for selection and playback; and,
   pushing each voice data of the voice data set sequentially to other first electronic devices than the first electronic device that generates the voice data in the single voice packet, to enable the first electronic device to display the voice icon.

4. The method of claim 3, comprising:
obtaining a sequenced order by sequencing voice data based on a preset voice sequencing rule in response to the voice data set comprising multiple pieces of voice data.

5. The method of claim 4, wherein said pushing each voice data of the voice data set to the second electronic device sequentially; and, pushing each voice data of the voice data set sequentially to other first electronic device comprises:
pushing each voice data of the voice data set to the second electronic device in the sequenced order to enable the second electronic device to display the voice icon; and/or, pushing each voice data of the voice data set to other first electronic devices than that generates the voice data in the sequenced order to enable the first electronic device to display the voice icon.

6. The method of claim 4, wherein the preset voice sequencing rule comprise:
sequencing voice data based on a sequence of sending time of the voice data;
sequencing the voice data based on a sequence of receiving time of the voice data; and
sequencing the voice data based on a user characteristic parameter, wherein the user characteristic parameter comprises a user online duration parameter, an activity level parameter, and/or a temporarily assigned weight parameter.

7. The method of claim 1, further comprising:
in response to a cancellation request sent by the first electronic device, deleting the voice data of the voice data set sent by the first electronic device that sends the cancellation request.

8. The method of claim 1, further comprising:
in response to a control request sent by the second electronic device, deleting the voice data selected from the voice data set, or playing the selected voice data on a loop.

9. A method for playing voice, which is applied to a first electronic device connected to a webcast server, the first electronic device having a first preset authority, the method comprising:
receiving audio-video data pushed by the server, the audio-video data comprising voice data recorded by a second electronic device connected to the server and voice data of a voice data set selected by a user of the second electronic device for playback, wherein the second electronic device has a second preset authority, and the voice data set comprises voice data uploaded by the first electronic device or another first electronic device; and
playing the audio-video data,
wherein the audio-video data comprises first audio voice data and second audio voice data-obtained by segmenting the voice data of the audio-video data, the first audio voice data comprises the voice data selected by the user of the second electronic device for playback, and the second audio voice data comprises the voice data recorded by the second electronic device, and said playing the audio-video data comprises:
playing the first audio voice data and the second audio voice data so that a playback volume of the second audio voice data is lower than a playback volume of the first audio voice data.

10. The method of claim 9, wherein the first preset authority comprises a viewing authority and a comment input authority, and the second preset authority comprises a recording authority, a playback authority, and an authority of selection for playback of the voice data set.

11. The method of claim 9, further comprising:
in response to an input request, recording an audio signal input by a user to form the voice data; and
sending the voice data to the server to enable the server to collect the voice data into the voice data set.

12. The method of claim 11, further comprising:
in response to a cancellation operation, sending a cancellation instruction formed by the cancellation operation to the server, wherein the cancellation instruction is used for controlling the server to delete the uploaded voice data.

13. The method of claim 9, comprising:
displaying each piece of voice data in the audio-video data on a display interface in a form of a voice icon.

14. A method for playing voice, which is applied to a second electronic device connected to a webcast server, the second electronic device having a second preset authority, the method comprising:
in response to a selection and playback instruction of a user, playing target voice data indicated by the selection and playback instruction, wherein the target voice data is any voice data of a voice data set, the voice data set comprises at least one piece of voice data received by the server from at least one first electronic device;
receiving audio-video data, comprising voice data, acquired by an acquisition device connected to the second electronic device;
playing the audio-video data which comprises the target voice data; and
sending the audio-video data to the server;
obtaining first audio voice data and second audio voice data by segmenting the voice data of the audio-video data, the first audio voice data comprising the target voice data, and the second audio voice data comprising the voice data acquired by the acquisition device; and
in response to the selection and playback instruction of the user, playing the first audio voice data and the second audio voice data so that a playback volume of the second audio voice data is lower than a playback volume of the first audio voice data.

15. The method of claim 14, wherein the first preset authority comprises a viewing authority and a comment input authority, and the second preset authority comprises a recording authority, a playback authority, and an authority of selection for playback of the voice data set.

16. The method of claim 14, further comprising:
in response to a control instruction of the user, deleting the target voice data, playing the target voice data on a loop, or deleting the voice data in the audio-video data.

* * * * *